United States Patent [19]

Fischer

[11] 4,097,585

[45] Jun. 27, 1978

[54] PRODUCTION OF SULFUR FROM CLAUS PROCESS WASTE GAS

[75] Inventor: Herbert Fischer, Lollar, Germany

[73] Assignee: Metallgesellschaft Aktiengesellschaft, Frankfurt am Main, Germany

[21] Appl. No.: 836,464

[22] Filed: Sep. 26, 1977

[30] Foreign Application Priority Data

Oct. 25, 1976 Germany ............................ 2648190

[51] Int. Cl.$^2$ ............................................ C01B 17/04
[52] U.S. Cl. ................................. 423/574 R; 423/576
[58] Field of Search ................ 423/570, 573, 574, 576

[56] References Cited

U.S. PATENT DOCUMENTS

| 3,717,699 | 2/1973 | Nicklin et al. | 423/576 |
| 3,752,877 | 8/1973 | Beavon | 423/573 X |
| 4,035,474 | 7/1977 | Kunkel et al. | 423/574 |

FOREIGN PATENT DOCUMENTS

| 924,872 | 4/1973 | Canada | 423/576 |
| 1,409,436 | 10/1975 | United Kingdom | 423/574 |

*Primary Examiner*—G. O. Peters
*Attorney, Agent, or Firm*—Burgess, Dinklage & Sprung

[57] ABSTRACT

In the Claus process wherein hydrogen sulfide and sulfur dioxide are reacted to form sulfur and a waste exhaust gas, the invention treats the exhaust gas to recover additional sulfur therefrom. This is done by (a) catalytically hydrogenating the exhaust gas with a hydrogen containing gas to form hydrogen sulfide from the sulfur and residual sulfur in such exhaust gas;

(b) simultaneously with step (a) catalytically hydrolyzing the carbon oxysulfide and carbon disulfide contained in the exhaust gas with steam to form hydrogen sulfide;

(c) oxidizing part of at least one of the hydrogen sulfide contained in the initial feed gas and the ultimate sulfur product with air in stoichiometric or slightly less amount to form sulfur dioxide;

(d) adding the sulfur dioxide produced in step (c) to the hydrogen sulfide-containing exhaust gas which has been subjected to steps (a) and (b) in an amount to establish a ratio of hydrogen sulfide to sulfur dioxide of about 2 : 1;

(e) catalytically reacting the hydrogen sulfide still contained in the exhaust gas after step (d) with sulfur dioxide at about 100° to 150° C to form sulfur, and recovering the sulfur; and (f) regenerating the catalyst with an oxygen-free hot gas containing hydrogen sulfide.

10 Claims, 2 Drawing Figures

PRODUCTION OF SULFUR FROM CLAUS PROCESS WASTE GAS

BACKGROUND

This invention relates to a process of increasing the yield of sulfur produced by the Claus process from hydrogen sulfide and other acid gases which contain sulfur compounds by a partial combustion of hydrogen sulfide to form sulfur and sulfur dioxide, comprising a catalytic reaction of the hydrogen sulfide contained in the resulting gas-in-process with sulfur dioxide at low temperature to form sulfur, and a condensation of sulfur and purification of the exhaust gas with recovery of sulfur.

It is known to produce sulfur by a catalytic reaction of hydrogen sulfide contained in mixed gases with sulfur dioxide by the Claus process (Opened German Specification No. 2,253,806).

It is also known to introduce the resulting exhaust gases at low temperatures below the dew point of sulfur into a bed of a catalyst which promotes the reaction of hydrogen sulfide with sulfur dioxide with formation of elementary sulfur (Opened German Specification No. 2,021,111, Opened German Specification No. 2,222,731, Printed German Application No. 1,667,636).

Besides it is known to pass the exhaust gases at low temperatures through a liquid absorbent, which absorbs hydrogen sulfide and sulfur dioxide, and to react both in the liquid phase on a catalyst to form elementary sulfur, which owing to its high specific gravity can easily be separated from the liquid absorbent (Opened German Specification No. 2,158,072).

Furthermore, it is known to hydrolyze or hydrogenate carbon oxysulfide and carbon disulfide on suitable catalysts with formation of hydrogen sulfide and to hydrogenate sulfur dioxide and sulfur on the same catalysts and at the same temperatures to form hydrogen sulfide (Opened German Specification No. 2,214,939).

All processes which have been disclosed thus far have the disadvantage that fluctuations of the rate and concentration of hydrogen sulfide in the feed gas result in fluctuations of the ratio of hydrogen sulfide to sulfur dioxide in the gas-in-process and in a lower yield of sulfur. Besides, the presence of carbon dioxide and hydrocarbons in the feed gas will induce the formation of undesired compounds, such as carbon oxysulfide and carbon disulfide, which further reduce the yield of sulfur and must be removed.

It is an object of the invention to eliminate these disadvantages and to provide a single process which can easily be carried out and permits of a production of sulfur by the Claus process and of a purification of the remaining exhaust gases to such a high degree that they can be discharged into the atmosphere without hesitation.

The purification should involve a recovery of elementary sulfur so that virtually all sulfur compounds contained in the starting product are reacted to form elementary sulfur. Specifically, the process should be economical and, contrary to the known processes, should have a low energy requirement and permit a sulfur yield in excess of 99%, even during an operation of the Claus plant under greatly varying conditions.

This object is accomplished according to the invention which involves (a) catalytically hydrogenating the residual exhaust gas with a hydrogen containing gas to form hydrogen sulfide from the sulfur and residual sulfur in such exhaust gas;

(b) simultaneously with step (a) catalytically hydrolyzing the carbon oxysulfide and carbon disulfide contained in the exhaust gas with steam to form hydrogen sulfide;

(c) oxidizing part of at least one of the hydrogen sulfide contained in the initial feed gas and the ultimate sulfur product with air in stoichiometric or slightly less amount to form sulfur dioxide;

(d) adding the sulfur dioxide produced in step (c) to the hydrogen sulfide-containing exhaust gas which has been subjected to steps (a) and (b) in an amount to establish a ratio of hydrogen sulfide to sulfur dioxide of about 2 : 1;

(e) catalytically reacting the hydrogen sulfide still contained in the exhaust gas after step (d) with sulfur dioxide at about 100° to 150° C to form sulfur, and (f) regenerating the catalyst with an oxygen-free hot gas containing hydrogen sulfide.

According to a preferred feature of the invention, the hydrogen sulfide and sulfur dioxide contained in the exhaust gas after step (d) is absorbed in a high-boiling organic liquid, which contains a dissolved catalyst, and the absorbed hydrogen sulfide is reacted to form sulfur.

A further preferred feature of the invention resides in that the sulfur-laden liquid absorbent is separated by sedimentation from the sulfur which has been formed.

According to a preferred feature of the invention, the hydrogen-containing gas is produced from hydrocarbons by a partial oxidation with air and/or oxygen with an addition of steam.

According to a preferred feature of the invention, the hydrogenation and hydrolysis are carried out at the same temperature.

A special advantage of the invention resides in that the hydrogenation and hydrolysis are carried out at temperatures of about 250° to 450° C, preferably at about 300° to 350° C.

The same catalyst is preferably used for the hydrogenation and hydrolysis.

Catalysts which contain oxides of metals of Group VI and/or VIII of the Periodic System have proved particularly suitable for the hydrogenation and hydrolysis.

Within the scope of the invention, a catalyst which comprises oxides of cobalt and of molybdenum has proved particularly suitable for the hydrolysis and hydrogenation. These oxides may be applied in known manner to a carrier, preferably to alumina.

The advantages afforded by the invention reside particularly in that a simple and economical method is provided in which sulfur can be produced by the Claus process with a high yield and the exhaust gas can be purified with recovery of sulfur and in such a high purity that it can be discharged into the atmosphere without hesitation and in compliance with ecological requirements.

An important further advantage afforded by the invention resides in that it permits reliable processing even of gases in which the rates and concentrations of hydrogen sulfide and other sulfur compounds and other components with calorific value exhibit great fluctuations.

The requirements of the process according to the invention as regards capital and utilities are much lower than those of known processes resulting in the same yield of sulfur.

The invention is illustrated in the drawings and will be described more fully hereinafter.

Figure 1:
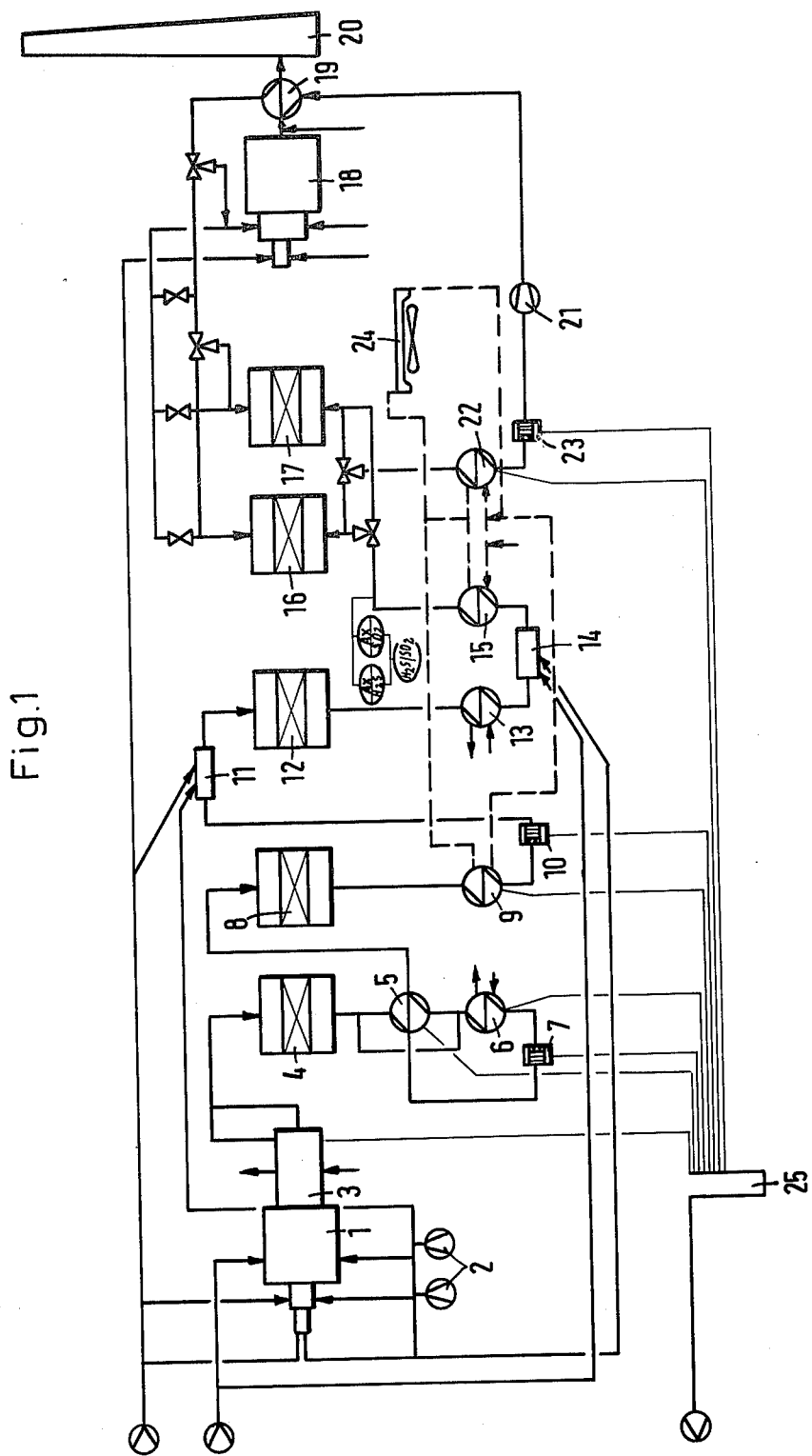
FIG. 1 is a diagrammatic view showing by way of example how the process according to the invention can be carried out in an embodiment in which hydrogen sulfide is strictly catalytically reacted with sulfur dioxide on solid catalysts to form sulfur.

In the figures the reference numerals have the following meanings:

1 — Claus combustion chamber, 2 — blower, 3 — waste heat boiler, 4 — Claus reactor, 5 — shell-and-tube heat exchanger, 6 — sulfur condenser, 7 — sulfur separator, 8 — second Claus reactor, 9 — second sulfur condenser, 10 — second sulfur separator, 11 — in-line-burner, 12 — hydrogenating reactor, 13 — gas-in-process cooler, 14 — in-line-burner, 15 — gas-in-process cooler, 16 — reactor, 17 — reactor, 18 — incinerator, 19 — preheater for regenerating gas, 20 — chimney, 21 — blower, 22 — cooler for regenerating gas, 23 — sulfur separator, 24 — air cooled steam condenser, 25 — seals, 26 — reactor, 27 — cooler-separator-unit, 28 — pump, 29 — starting heat exchanger, 30 — pump, 31 — pump, 32 — pump.

In accordance with FIG. 1, the acid constituents coming from scrubbers are reacted in known manner in a Claus combustion chamber 1 with atmospheric oxygen, which is supplied by blowers 2. In the succeeding waste heat boiler 3, the resulting heat of reaction is utilized to produce high-pressure steam. The gas-in-process is cooled to about 260° to 300° C, depending on its carbon oxysulfide and carbon disulfide contents, and is fed to the first Claus reactor 4. The temperature is controlled by means of hot gas flowing from the combustion chamber through suitable automatically controlled bypass valves.

A further reaction of the $H_2S$ with $SO_2$ to form elementary sulfur is effected on a suitable catalyst. Carbon oxysulfide and carbon disulfide are hydrolyzed and in dependence of the hydrogen content of the gas-in-process are partly hydrogenated.

The gas-in-process leaving the Claus reactor 4 is passed through the tubes of a shell-and-tube heat exchanger 5 and then through a sulfur condenser 6 and is thus cooled to temperatures below about 165° C to remove sulfur from the gas. The waste heat is utilized to generate medium-pressure steam. The gas-in-process which has left the sulfur condenser 6 flows through a sulfur separator 7 and is then heated on the shell-side of the shell-and-tube heat exchanger 5 to the operating temperature of the second Claus reactor 8 (about 200° - 220° C).

The temperature is controlled by a stream which by-passed the shell-and-tube heat exchanger 5. In the second Claus reactor 8, hydrogen-sulfide is further reacted with sulfur dioxide to form sulfur in dependence on the reactor temperature. In this temperature range there is only a slight conversion of carbon oxysulfide and carbon disulfide.

Because the reaction of hydrogen sulfide with sulfur dioxide to form sulfur is exothermic, a temperature decrease results in an equilibrium ratio which is more favorable as regards sulfur. For this reason the second Claus reactor 8 is operated at a temperature which is only a few degrees above the dew point of sulfur so that a satisfactory continuous operation is ensured. In this way, a sulfur recovery up to 95%, depending on the hydrogen sulfide content in the acid gas, can be achieved in continuous operation.

The gas-in-process leaving the second Claus reactor 8 is fed to another sulfur condenser 9 and is cooled therein to temperatures below about 135° C but not below about 120° C whereby the sulfur contained in the gas-in-process is reduced to a residual content below about 1 g/standard cubic meter.

The sulfur condenser 9 is succeeded by a sulfur separator 10, which is designed like 7. The gas-in-process leaving the separator 10 is heated to about 300° - 320° C in an in-line-burner 11, in which hydrogen for hydrogenation is also added and/or hydrocarbons are sub-stoichiometrically burnt to produce a hydrogenating gas.

The gas-in-process leaving the in-line-burner 11 is fed to a hydrogenating reactor 12, in which sulfur and sulfur dioxide are reacted with hydrogen for conversion to hydrogen sulfide, and carbon oxysulfide and carbon disulfide are reacted with hydrogen and steam for conversion to hydrogen sulfide. The reactions are preferably performed at temperatures of about 320° to 360° C on a catalyst which comprises metals of Groups VI and VIII of the Periodic System on an activated alumina carrier.

The gas-in-process leaving the hydrogenating reactor contains residual carbon oxysulfide and carbon disulfide in combined amount below about 150 ppm by volume and less than about 100 ppm by volume residual sulfur dioxide, and sulfur cannot be detected therein. This gas is cooled to temperatures below about 165° C in a succeeding gas-in-process cooler 13. The heat which becomes available is used to generate medium-pressure steam.

The gas-in-process which leaves the gas-in-process cooler 13 flows through a further in-line-burner 14, where a separate hydrogen sulfide stream is burnt to produce the required sulfur dioxide. The heat which is thus generated is taken off in a gas-in-process cooler 15, in which the gas-in-process is cooled to temperatures below about 130° C. The heat which becomes available is used to generate low-pressure steam, which is conducted in a closed cycle and condensed in an air-cooled steam condenser 24.

The gas leaving the gas-in-process cooler 15 is analyzed and the ratio of hydrogen sulfide to sulfur dioxide is exactly controlled. Hydrogen sulfide is then further reacted with sulfur dioxide in one of the succeeding reactors 16 and 17 at temperatures below about 150° C, preferably about 120° to 135° C, in the condensing range of sulfur. These reactors 16 and 17 contain impregnated alumina as an active adsorbent.

At the temperatures maintained (about 125° C), the hydrogen sulfide reacts with the sulfur dioxide to form sulfur. a sulfur recovery up to about 99.5%, based on the sulfur fed to the Claus plant, can be achieved in continuous operation.

Because the sulfur formed in the reactor 16 or 17 is adsorbed by the catalyst, the latter must be thermally regenerated when a certain loading has been reached.

The gas-in-process leaving the reactor 16 or 17 is fed at a temperature of about 1250° to 130° C to an incinerator 18, in which the residual hydrogen sulfide, carbon oxysulfide, carbon disulfide, sulfur, hydrogen and carbon monoxide are completely oxidized with a suitable excess of air. Regulations to prevent air pollution require the operation of the incinerator at temperatures between about 600° and 800° C to reduce the hydrogen sulfide content below about 10 mg/standard cubic meter in the exhaust gas. The temperatures are ensured by burning fuel gas.

The exhaust gas leaving the incinerator 18 is quenched by a supply of cooled air (or in a further waste-heat boiler, not shown here) and is then fed through a preheater 19 for regenerating gas to a chimney 20, from which it is discharged into the atmosphere.

Desorption is effected in known manner by means of an oxygen-free desorbent gas, which is withdrawn behind the gas-in-process cooler 13 and is circulated by a blower 21 in a closed cycle, in which the gas flows through the preheater 19 for the regenerating gas to the reactor 16 or 17. The sulfur that has been desorbed by the desorbent gas is condensed in a succeeding cooler 22 for the regenerating gas, which is then returned to the blower 21 through a sulfur separator 23. To cool the reactor 16 or 17 which has thus been regenerated, a partial stream of gas-in-process is withdrawn before the incinerator 18 and is sucked by means of the blower 21 through the reactor 16 or 17, through the cooler 22 for regenerating gas, and through the sulfur separator 23 and is then returned through the preheater 19 for the regenerating gas to the incinerator 18 behind the point of withdrawal.

The heat which becomes available in the cooler 22 for regenerating gas is converted into low-pressure steam and the latter together with the low-pressure steam from the sulfur condenser 9 and the gas-in-process cooler 15 is condensed in an air-cooled steam condenser 24. The condensate flows by gravity to 9, 16 and 22 (closed cycle) and is transformed into low-pressure steam.

The sulfur which becomes available in the waste-heat boiler 3, the sulfur condensers 6 and 9, the shell-and-tube heat exchanger 5, the cooler 22 for regenerating gas, and the sulfur separators 7, 10 and 23 is removed from the plant through steam jacketed lines and sulfur seals 25.

Figure 2:
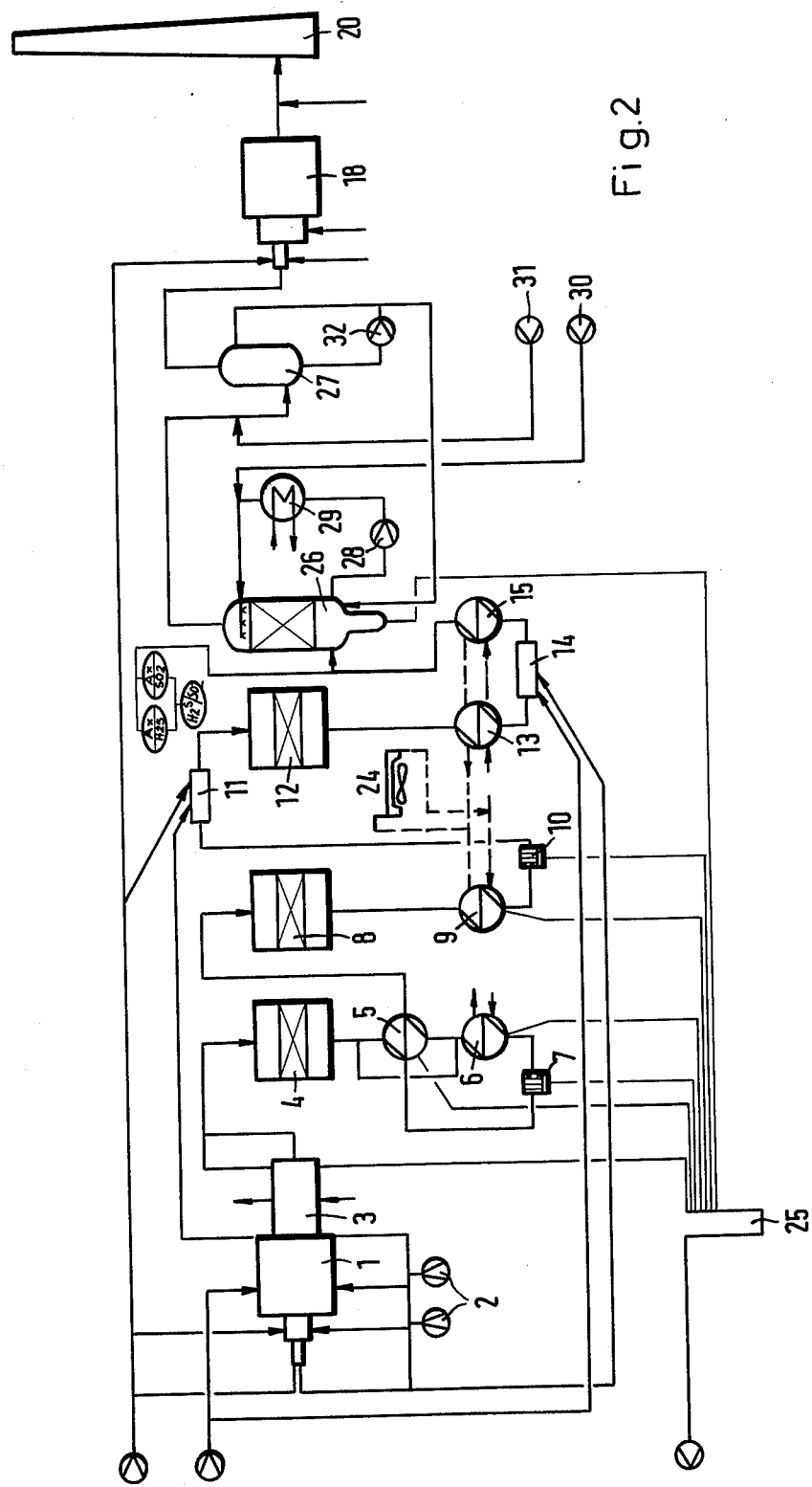
FIG. 2 illustrates the same process in which a catalyst is used that is dissolved in a high-boiling organic liquid.

The combined process system shown in FIG. 2 is similar to the system shown in FIG. 1 as far as to the gas-in-process cooler 15.

The gas-in-process leaving the gas-in-process cooler 15 is fed at about 120° to 125° C to the reactor 26 in which the hydrogen sulfide and sulfur dioxide are absorbed and are simultaneously converted into elementary sulfur.

The gas-in-process leaving the reactor 26 is fed to a direct cooler-separator unit 27, in which the gas-in-process is cooled by about 15° to 20° C and the entrained droplets of absorbent are separated. The gas-in-process is then passed through an incinerator 18 to a chimney 20, from which it is discharged into the atmosphere.

The liquid absorbent is circulated by a pump 28 to flow through a starting heat exchanger 29 to the reactor 26. Sulfur which becomes available is discharged from the sump of the reactor 26 through a seal 25. To make up for the losses of liquid absorbent, additional liquid absorbent is fed by a pump 30. A cooling is effected in that boiler feed water or condensate handled by a pump 31 is injected into the gas-in-process stream before the direct cooler-separator unit 27. A pump 32 ensures a circulation of liquid absorbent at a suitable rate, a suitable part of which is recycled to the reactor 26.

By the addition of the fuel gas and the air required for its combustion, also of the hydrogen and of about two-thirds of the air required for the production of $SO_2$, the volume of the gas-in-process to be subjected to cold conversion is increased by about 18%.

The capital requirements for the hydrogenating stage amount to about 15% and the capital requirements for the cold conversion stage allowing for an increase in volume by 18% amount to about 33 – 35% of those of the two-stage Claus process plant. It is thus apparent that a sulfur yield of almost 99.5% can be ensured without additional ecological problems, such as would be involved in acid condensates, and at only 50% of the costs of known processes. The supply requirements are also incomparably lower than in known processes.

The invention will be further described in the following illustrative example;

Example

Typical acid gas from a refinery had the following composition in % by volume:

| | | |
|---|---|---|
| $H_2S$ | 67.0 | |
| $CO_2$ | 24.0 | |
| HC (hydrocarbons) | 1.0 | (average molecular weight 30) |
| $N_2$ + Ar | 4.0 | |
| $NH_3$ | 1.0 | |
| $H_2O$ | 3.0 | |

The gas-in-process behind the second reactor stage at a sulfur yield of 95% had the following composition in % by volume:

| | |
|---|---|
| $H_2S$ | 0.49 |
| $SO_2$ | 0.45 |
| $H_2O$ | 29.50 |
| $S_8$ | 0.02 |
| COS | 0.12 |
| $CS_2$ | 0.04 |
| CO | 0.27 |
| $CO_2$ | 10.05 |
| $H_2$ | 0.41 |
| $N_2$ + Ar | 58.65 |

After the hydrogenation and controlled addition of $SO_2$, the gas-in-process had the following composition in % by volume:

| | Before the cold conversion | After the cold conversion |
|---|---|---|
| $H_2S$ | $0.1142 \times 10^{-1}$ | $0.3977 \times 10^{-3}$ |
| $SO_2$ | $0.5711 \times 10^{-2}$ | $0.8336 \times 10^{-4}$ |
| $H_2O$ | $0.2706 \times 10^0$ | $0.2832 \times 10^0$ |
| COS | $0.1505 \times 10^{-3}$ | $0.1505 \times 10^{-3}$ |
| $CS_2$ | $0.1505 \times 10^{-3}$ | $0.1505 \times 10^{-3}$ |
| CO | $0.9490 \times 10^{-2}$ | $0.9544 \times 10^{-2}$ |
| $CO_2$ | $0.9534 \times 10^{-1}$ | $0.9604 \times 10^{-1}$ |
| $H_2$ | $0.2456 \times 10^{-1}$ | $0.2470 \times 10^{-1}$ |
| $CH_4$ | $0.3905 \times 10^{-2}$ | $0.3927 \times 10^{-2}$ |
| $N_2$ | $0.5787 \times 10^0$ | $0.5819 \times 10^0$ |

The residual sulfur content of the gas-in-process amounted to about 0.3 g/standard cubic meter. For a Claus plant operating at 100 metric tons per day, the above data correspond to the following approximate rates in standard cubic meters per hour:

| | | |
|---|---|---|
| Acid gas feed to Claus plant | 4355 (about 2918 $H_2S$) | |
| Gas-in-process after cold conversion | 12550 | |
| Elementary sulfur in exhaust gas | appr. | 2.63 |
| S in $H_2S$ in exhaust gas | " | 4.99 |
| S in $SO_2$ in exhaust gas | " | 1.05 |
| S in COS in exhaust gas | " | 1.89 |

-continued

| | | |
|---|---|---|
| S in CS₂ in exhaust gas | " | 3.78 |
| Total sulfur in exhaust gas | " | 14.37 |

Sulfur yield, based on sulfur compounds fed to overall plant 99.5%.

| | | |
|---|---|---|
| Fuel gas for hydrogenation | appr. | 70 |
| Combustion air for hydrogenation | " | 960 |
| Hydrogen for hydrogenation | " | 390 |
| Acid gas for SO₂ production | " | 108 |
| Air for SO₂-producing burner | " | 540 |

It will be appreciated that the instant specification and examples are set forth by way of illustration and not limitation, and that various modifications and changes may be made without departing from the spirit and scope of the present invention.

What is claimed is:

1. In the process for producing sulfur wherein hydrogen sulfide contained in a feed gas is partially combusted to form sulfur and sulfur dioxide, the balance of the hydrogen sulfide is catalytically reacted with the sulfur dioxide at a low temperature to form sulfur, and the sulfur produced is separated from the residual exhaust gas, the improvement which comprises
   (a) catalytically hydrogenating the residual exhaust gas with a hydrogen containing gas to form hydrogen sulfide from the sulfur and residual sulfur in such exhaust gas;
   (b) simultaneously with step (a) catalytically hydrolyzing the carbon oxysulfide and carbon disulfide contained in the exhaust gas with steam to form hydrogen sulfide;
   (c) oxidizing part of at least one of the hydrogen sulfide contained in the initial feed gas and the ultimate sulfur product with air in stoichiometric or slightly less amount to form sulfur dioxide;
   (d) adding the sulfur dioxide produced in step (c) to the hydrogen sulfide-containing exhaust gas which has been subjected to steps (a) and (b) in an amount to establish a ratio of hydrogen sulfide to sulfur dioxide of about 2 : 1;
   (e) catalytically reacting the hydrogen sulfide still contained in the exhaust gas after step (d) with sulfur dioxide at about 100° to 150° C to form sulfur, and recovering the sulfur; and
   (f) regenerating the catalyst with an oxygen-free hot gas containing hydrogen sulfide.

2. A process according to claim 1, including the further step of absorbing hydrogen sulfide and sulfur dioxide contained in the exhaust gas after step (d) in a high-boiling organic liquid containing a dissolved catalyst, the absorbed hydrogen sulfide and sulfur dioxide reacting to form sulfur.

3. A process according to claim 2, including the further step of separating the sulfur laden liquid absorbent from the sulfur which has been formed by sedimentation.

4. A process according to claim 1, wherein the hydrogen-containing gas of step (a) is produced from hydrocarbons by a partial oxidation with at least one of air and oxygen plus steam.

5. A process according to claim 1, wherein the hydrogenation of step (a) and hydrolysis of step (b) are carried out at the same temperature.

6. A process according to claim 1, wherein the hydrogenation of step (a) and hydrolysis of step (b) are carried out at temperatures of about 250° to 450° C.

7. A process according to claim 1, wherein the hydrogenation of step (a) and hydrolysis of step (b) are effected in the presence of the same catalyst.

8. A process according to claim 1, wherein the hydrogenation of step (a) and hydrolysis of step (b) are carried out in the presence of a catalyst comprising the oxide of at least one metal of Groups VI and VIII of the Periodic System.

9. A process according to claim 8, wherein the catalyst comprises oxides of cobalt and of molybdenum on a carrier.

10. A process according to claim 3, wherein the initial hydrogen-containing feed gas of step (a) is produced from hydrocarbons by a partial oxidation with at least one of air and oxygen plus steam, and the hydrogenation and hydrolysis are carried out at about 300° to 350° C in the presence of a catalyst comprising oxides of cobalt and molybdenum on alumina.

* * * * *